United States Patent [19]

Hamilton

[11] Patent Number: 4,944,434

[45] Date of Patent: Jul. 31, 1990

[54] AUTOMOBILE PORTABLE HAULER

[76] Inventor: Kenneth B. Hamilton, 1408 Granville Rd., Westfield, Mass. 01085

[21] Appl. No.: 374,259

[22] Filed: Jun. 30, 1989

[51] Int. Cl.$^5$ .......................... B60R 9/00; B60R 11/00
[52] U.S. Cl. ...................... 224/42.45 R; 224/42.46 R; 224/42.43; 224/273; 248/214; 248/215
[58] Field of Search ................. 224/42.45 R, 42.46 R, 224/309, 310, 321–325, 42.38, 42.42, 273, 329, 42.43; 211/70.5, 70.8, 119; 248/670, 172, 215, 214

[56] References Cited

U.S. PATENT DOCUMENTS

| | | | |
|---|---|---|---|
| 252,381 | 1/1882 | Hyre | 224/42.45 R |
| 1,919,271 | 7/1933 | Cady | 224/42.45 R |
| 2,116,443 | 5/1938 | McMillen | 224/42.45 R |
| 2,425,629 | 8/1947 | Mayer | 224/42.45 R |
| 2,499,654 | 3/1950 | Kuhlman | 224/42.45 R |
| 2,536,797 | 1/1951 | Cooke | 224/42.45 R |
| 4,007,864 | 2/1977 | Hreha | 224/42.43 |
| 4,607,773 | 8/1986 | Mason | 224/42.45 R |

*Primary Examiner*—Henry J. Recla
*Assistant Examiner*—Keith Kupferschmid
*Attorney, Agent, or Firm*—Leonard S. Michelman

[57] ABSTRACT

An automobile portable hauler comprising a means for transporting supplies and equipment by the use of a conventional automobile on the exterior of the vehicle by the uses of brackets that are collapsible, are space savers and are easily assembled and adapted to the vehicle. There are 2 U-shaped members that are adapted to fit over the door when the window of the vehicle is open and in a down position. The U-shaped members are connected to a horizontal main member. Fastened to the main member at each end thereto is a bracket having a means for extending the main member longitudinally, a perpendicular extension in the same plane as the main member and extending forward from the door of the vehicle, and an extension member of said vertical extension to said plane of said vertical extension and parallel to the vertical section of the U-shaped member, whereby a cradle is formed at both ends of the main member to support and carry lengths of lumber, pipes, girders and other such items. The U-shaped members are longer on the outside of the door and are of such shape and configuration that they are inserted within an intermediary section whereby they may be adjusted higher or lower, and whereby they may be engaged or disengaged for easily assembly or disassembly. So also the main body extensions are of such configuration that they are easily inserted into the main body member and can be extended within limits for change of size adjustment and for easily disassembly.

14 Claims, 2 Drawing Sheets 4,944,434

AUTOMOBILE PORTABLE HAULER

BACKGROUND OF INVENTION

1. Field of the Invention

The present invention relates to the technology of carrying elongated items by an automobile. Instead of inserting elongated items into the automobile through the window and having them protrude out diagonally so as to be cumbersome, the within invention contemplates and attempts to provide a method and an article of manufacture that permits the carrying of elongated items on the side of automobiles. This replaces the necessity of renting trucks and vans, and gives the automobile more utility. The device is easily assembled, is compact, and may be stored in the trunk of the automobile.

2. Description of the Prior Art

In the prior art, there are other attempts to solve the problem of this invention. The prior art requires a modification of the automobile equipment by having brackets permanently secured to the fenders and the light.

Patents of the prior art include a patent to Thomas A. Mason, U.S. Pat. No. 4,607,773 dated Aug. 26, 1986 which requires his hook to be inserted over the trunk of the automobile and the trunk of the automobile lid has to remain open.

Another patent was issued by the Patent Office to W. O. Davies U.S. Pat. No. 2,302,300 which has to be fastened to the automobile itself by suction cups.

Another patent was issued to Richard C. Zercher, U.S. Pat. No. 3,580,441 which requires a special fastening device to the fenders of the automobile.

These have been attempts to solve the problems anticipated by the within invention but, have left problems existing that this invention solves.

The prior art does not have a method of assembly, disassembly, portablity, and safety, as well as the low cost of manufacture as disclosed by the within invention.

OBJECTS OF THE INVENTION

It is a principal object of the present invention to create a device for hauling elongated subject matter in a safe manner by an automobile.

It is another object of the within invention to provide an apparatus that is easily assembled and can be portably stored in the automobile whereby it may be easily assembled and used as the need arises.

It is yet another object of the within invention to provide lightweight, simple to assemble components for carrying elongated subject matter, and for easy adaption to ease with a conventional automobile.

It is still a further object of the within invention to provide strong and lightweight supports for carrying heavy and long subject matter such as lumber, pipes, and the like.

These and other objects are obtained by the use of components that are collapsible and act as space savers when they are disassembled. The brackets and components are adapted to fit over and onto the vehicle without permanent attachment, and yet are very secure.

SUMMARY OF INVENTION

There are two U-shaped members that are adapted to fit over the door when the window of the vehicle is open and in a down position.

The U-shaped members are sufficiently long so that they cannot become disconnected from the doors. The U-shaped member are securely connected to a horizontal main member and fastened to the main frame member at each end. There is a component assembly having a means for extending the main member a further longitudinal distance parallel to the length of the automobile.

There are also perpendicular extension members fastened to the main member, which extend in the vertical plane of the U-shaped members whereby a cradle is formed at both ends of the main member to support and carry lengths of lumber, pipes, girders, and other such items. The U-shaped members are longer on the outside of the door and are of such shape and configuration that they are inserted within an intermediary section connected to the main frame whereby they may be adjusted higher or lower and whereby they may be engaged or disengaged for easy assembly or disassembly, so as to adapt them to fit automobile doors of various sizes and dimensions.

BRIEF DESCRIPTION OF THE DRAWINGS

These and other objects may be determined and ascertained from the invention by reference to the detailed description of the drawings in which.

A typical 4 door automobile 26 has two side doors 27a and 27b.

Some automobiles only have two doors. These include convertables or hardtops. On many later model autos, the rear window does not recede completely.

The portable hauler assembly of this invention is designed to fit either over one side door or two side doors. The assembly comprises of a horizontal main frame member 1. The preferred embodiment of member 1 is a flat girder so as to form a strong shelf. Extending from main frame member 1 are vertical members which have hollow interiors and are tubular in shape. This design makes for a lighter weight, as well as adapting same for the versatility hereinafter described.

Figure 3:
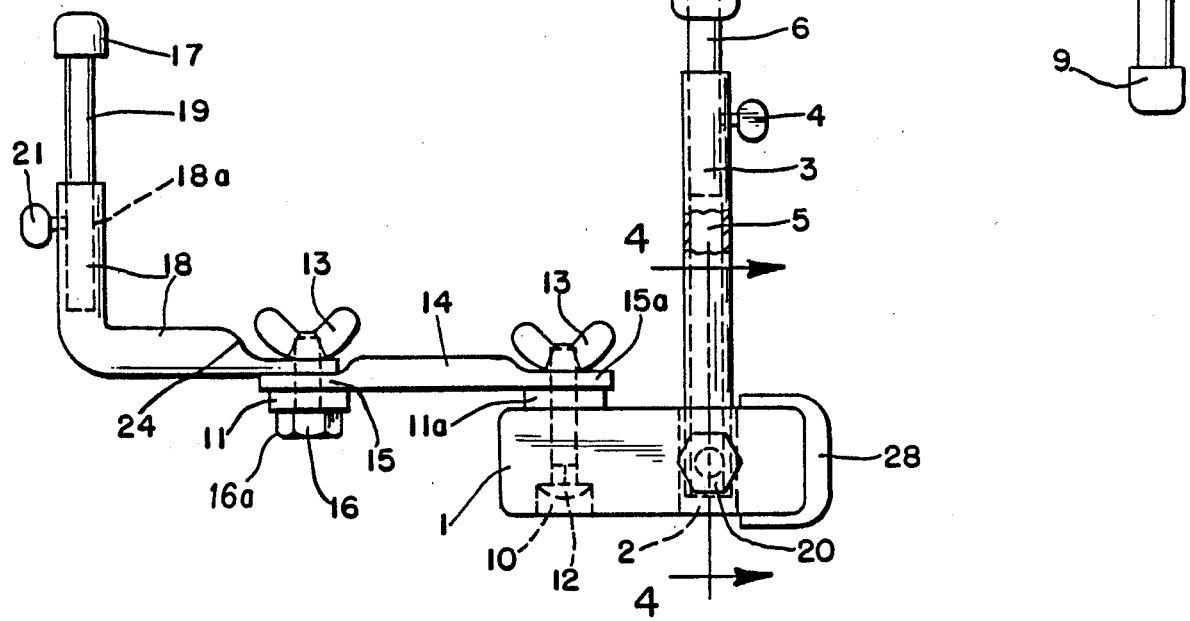
FIG. 3 is a view of the end bracket assembly of the portable hauler in extended position.
Figure 4:
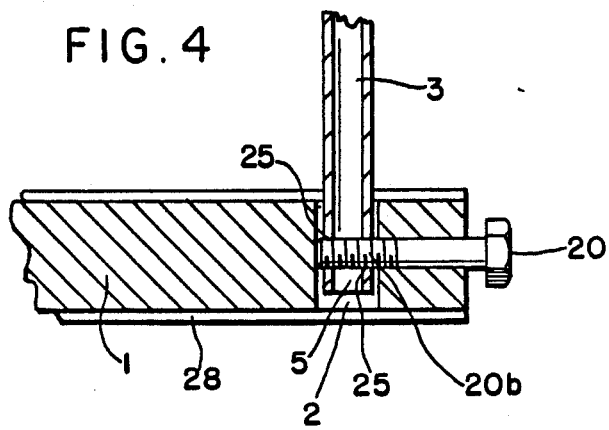
FIG. 4 is a cross section view taken at 4—4 of the end bracket assembly of FIG. 3.

In the view of FIG. 3, there is an opening 2 in the frame member 1. Mounted in opening 2 is a lock bolt 20 which passes through 1 to engage and lock the hollow shaft 3 into position so that it cannot be disassembled or become loose. Reference is made to FIG. 4 to view this detail of construction. There is an opening 25 in the vertical hollow shaft 3 for the bolt 20 to pass there through. The interior of the opening 25 has threads 20b to maintain the bolt 20 in a locked position within the tubular vertical shaft 3. Shaft 3, being hollow as indicated at 5, is adapted to receive the vertical hollow tubular insert extension 6. The vertical insert extension 6 may be adjusted by means of the lock nut or thumb screw 4 which is threaded in the wall of member 3. Grommet 7 is located at a position that is preselected to protect the surface of the door from scratching and damage. Grommet 7 surrounds the vertical extension 6 since it likely will be resting and hitting the surface of the door of the automobile as the automobile is driven. The grommet 7 can be slid over the surface of extension 6 to the appropriate location so as to prevent any scratching or injury to the paint and finish on the automobile. The extension 6 has a U-shape at its upper portion as indicated in the drawing at 8, which enables it to fit over the door 27b of the automobile.

The tip of member 6 after it bends down from its top 8 becomes parallel to 6, and has a cap 9 also, for preventing injury. The U-shaped tubular extension 6 is also hollow in order to keep its weight light.

Also connected to the main frame member 1, as can be seen in the end view of FIG. 3, is a wing nut 13 mounted on a carriage bolt 12 which is inserted in recess 10 in the main frame. The recess 10 enables the carriage bolt 12 to be within the lower surface of member 1 and pass through the flat surface of cradle forming horizontal member 14 of the flat surface portion 15a. The extended portion 18 is L-shaped and tubular except at its lower end. It has a flat recessed surface 24 upon which another wing nut 13 can be threaded on the bolt 16. The wing nut 13 is located at the other end of the horizontal support extension 14 which also has a flat surface 15 and which enables the bolt 16 to be locked by the wing nut 13 securing the perpendicular extension 18 to the horizontal support extension 14. This can be seen in the view of FIG. 3. Threaded on the bolt 16 is the nut 16a as shown in FIG. 3 of the drawing.

There is a raised washer 11 located between the bolt 16 and the flat surface 15 of the cradle forming horizontal member 14. Also, between the flat surface 15a of horizontal member 14 above the main frame member 1 surrounding bolt 12 there is a raised washer 11a.

When the wing bolt 13 is loosened by unthreading from the bolt 16, the flat surface portion 24 of member 18 and the flat surface 15 of the cradle forming horizontal member 14, can be rotated to predetermined positions.

Figure 1:
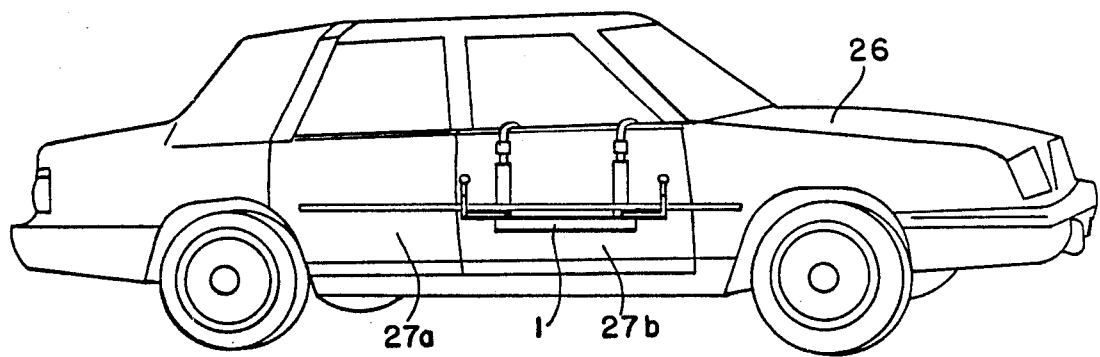
FIG. 1 is a side elevational view in perspective of an automobile, showing the portable hauler assembly in place over the door.
Figure 2:
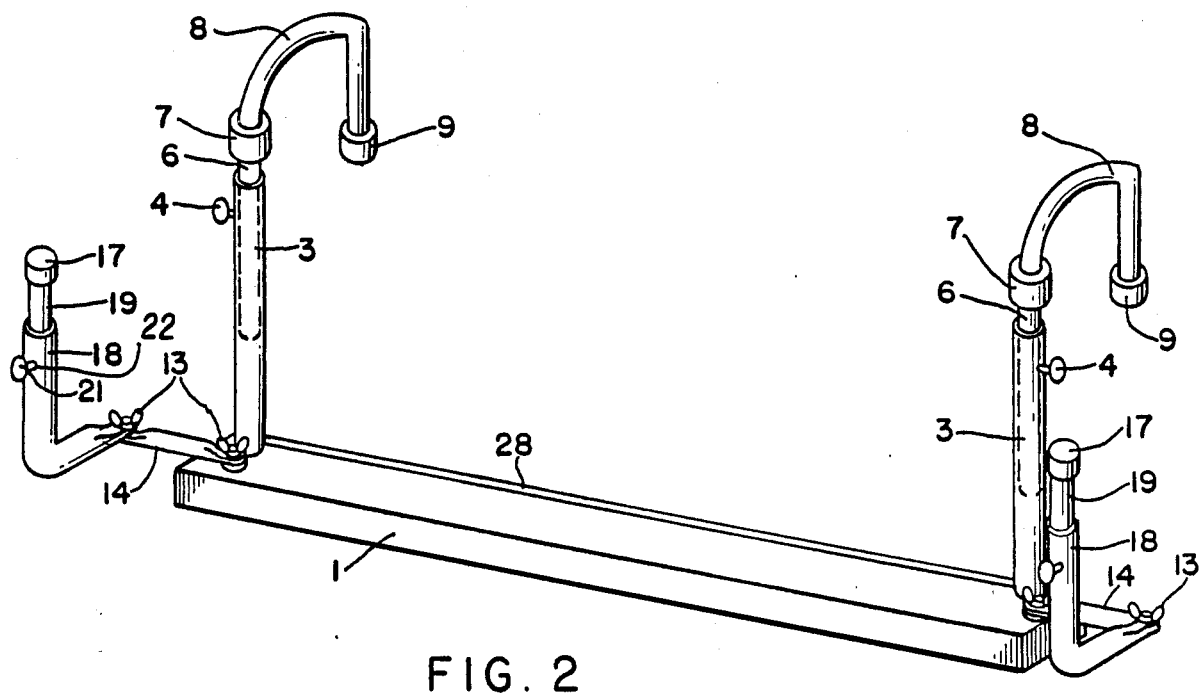
FIG. 2 is a perspective view of the portable hauler assembly in detail.

In the view of FIG. 2 L-shaped member 18 is rotated at right angles so that the horizontal portion of L-shaped member 18 is at right angle to said cradle forming horizontal member 14.

Mounted within the tubular L-shaped member 18 which has a hollow inside surface 18a, is the vertical insert tubular extension 19. Mounted at the tip of 19 is a cap 17. There is a thumb screw 21 threaded into 18 to secure and lock 19 into a predetermined position. Vertical extension 19 may be moved up or down in the hollow vertical portion of L-shaped member 18 by loosening the thumb screw 21 in the opening 22. FIG. 3 demonstrates a position of vertical extension 19 inside 18a. This can be raised or lowered depending upon the requirements of the load that is being carried.

There is a soft material 28 which is secured to the main frame member 1 so that same will not injure the side of the doors of the automobile.

In operation when the portable hauler is to be assembled, the main frame member is selected. The bolt 20 is inserted through vertical member 3, and threaded. Vertical insert extension 6 is placed in the top of 3 and secured by turning thumb screw 4. It is necessary to hang the U-shaped member 6 perpendicular to the main frame member 1. A grommet 7 is then placed at the strategic location on 6 to cushion the assembly from the automobile door 27b. At the other end of main frame member 1 the same procedure is required.

The final step in the assembly prior to placing the load is to form the cradle for the load. Bolt 12 is passed through the opening 10 in the main frame 1.

It is passed through raised washer 11a and flat surface 15a of cradle forming horizontal member 14 and then locked into position by tightening wing nut 13. This procedure is done at both ends of the assembly.

L-shaped member 18 is now connected to member 14 by means of passing wing bolt 16 through flat surface 24 of L-shaped member 18, flat surface 15 of member 14, raised washer 11 and placing nut 16a onto bolt 16 and turning same at wing 13. If a long cradle is desired L-shaped member 18 is as shown in FIG. 3. If a smaller cradle is desired cradle forming member 14 is rotated to extend main frame member 1 as shown in FIG. 2 and L-shaped member 18 is rotated to be perpendicular to extension 14. Vertical insert member 19 is placed inside 18 at 18a and thumb screw 21 is rotated to lock 19 into its desired position.

A cradle is now formed at end of the main frame member by repeating this assembly of extension member 14 to L-shaped member 18.

The U-shaped members are placed over the door or doors as desired when the windows of the automobile doors are lowered. Adjustments to the size of the load are and can be easily made by raising or lowering the heights of vertical members 19 and U-shaped member 6. Also, the main frame member can be lengthened by rotating 14 on the bolt 12. Also, the cradle can be widened by rotating extension 14 to the position shown in FIG. 3.

I claim:

1. A portable hauler adapted to carry a load on the side of an automobile comprising a horizontal main frame member having a front and rear portion, a first U-shaped means adapted to fit over an open window of an automobile, means for connecting said first U-shaped means to said main frame member at one end thereof, a second U-shaped member adapted to fit over the open window of an automobile, means for connecting said second U-shaped member to said main frame member at the other end thereof, a first cradle forming horizontal member, adjustable means for connecting said first cradle forming horizontal member to the front portion of said main frame member, opposite the first U-shaped member, a first L-shaped member having a top and a bottom portion and being connected to the first cradle member, adjustable means connected to said first cradle forming horizontal member, a second cradle forming horizontal member, adjustable means for connecting said second cradle forming horizontal member to the front portion of said main frame member and opposite the second U-shaped member, a second L-shaped member having a top and a bottom portion and being connected to the second cradle member, adjustable means connected to said second cradle forming horizontal member, whereby a cradle is formed between the U-shaped members and the L-shaped members on said main frame for carrying an elongated load on the side of an automobile.

2. A portable hauler adapted to carry a load on the side of an automobile as described in claim 1, wherein the first and second U-shaped members are made of hollow tubing, and wherein a vertical hollow shaft having a top and a bottom portion is connected between the main frame and the first and second U-shaped members, and one leg of said first and second U-shaped members are adapted to be inserted within the vertical hollow shaft, a thumb screw mounted within and near the top of said vertical shaft, whereby said the first and second U-shaped members may be adjusted by raising or lowering and locked into position by said thumb screw.

3. A portable hauler adapted to carry a load on the side of an automobile as described in claim 2 wherein the first and second L-shaped members are made of hollow tubing, and wherein a vertical tubular extension is adapted to be inserted within the L-shaped members, a thumb screw mounted within and near the top of said L-shaped members, whereby the vertical extension may be adjusted by raising or lowering it and locked into position by said thumb screw.

4. A portable hauler adapted to carry a load on the side of an automobile as described in claim 3 wherein the means for connecting the cradle forming horizontal member to the main frame member comprises a bolt size opening in the main frame member, a washer, a bolt and a wing nut, a flat portion at the end of the cradle forming member, a bolt size opening of said flat portion whereby said bolt passes through the main frame member, through the washer, through the opening in the flat portion of the cradle forming member, and is threaded to said wing nut for locking said bolt and securing said cradle forming member to the main frame and whereby the cradle forming member may be rotated on the axis of said bolt, so as to extend the length of the main member or, to be perpendicular to said main frame member so as to form a cradle between the U-shaped member and the L-shaped member.

5. A portable hauler adapted to carry a load on the side of an automobile as described in claim 2, whereby the adjustable means connecting first and second the cradle forming horizontal members comprises a flat end of said cradle forming horizontal members with a bolt size opening therein, a flat horizontal end of said first and second L-shaped members having a bolt size opening therein, a wing bolt assembly adapted to pass through said openings and secured by a nut and washer, whereby the L-shaped member may be rotated on the axis of said bolt to increase or decrease the size of the cradle formed between it and the first and second U-shaped members.

6. A portable hauler adapted to carry a load on the side of an automobile as described in claim 5 wherein the means for connecting the cradle forming horizontal member to the main frame member comprises a bolt size opening in the main frame member, a washer, a bolt and a wing nut, a flat portion at the end of the cradle forming member, a bolt size opening of said flat portion whereby said bolt passes through the main frame member, through the washer, through the opening in the flat portion of the cradle forming member, and is threaded to said wing nut for locking said bolt and securing said cradle forming member to the main frame and whereby the cradle forming member may be rotated on the axis of said bolt, so as to extend the length of the main member, or to be perpendicular to said main frame member so as to form a cradle between the U-shaped member and the L-shaped member.

7. A portable hauler adapted to carry a load on the side of an automobile as described in claim 2 wherein the means for connecting the cradle forming horizontal member to the main frame member comprises a bolt size opening in the main frame member, a washer, a bolt and a wing nut, a flat portion at the end of the cradle forming member, a bolt size opening of said flat portion whereby said bolt passes through the main frame member, through the washer, through the opening in the flat portion of the cradle forming member, and is threaded to said wing nut for locking said bolt and securing said cradle forming member to the main frame and whereby the cradle forming member may be rotated on the axis of said bolt, so as to extend the length of the main member, or to be set perpendicular to said main frame member so as to form a cradle between the U-shaped member and the L-shaped member.

8. A portable hauler adapted to carry a load on the side of an automobile as described in claim 1 wherein the first and second L-shaped members are made of hollow tubing, and wherein a vertical tubular extension is adapted to be inserted within the L-shaped members, a thumb screw mounted within and near the top of said L-shaped members, whereby the vertical extension may be adjusted by raising or lowering it and locked into position by said thumb screw.

9. A portable hauler adapted to carry a load on the side of an automobile as described in claim 8, whereby the adjustable means connecting the cradle forming horizontal member comprises of a flat end of said cradle forming horizontal member with a bolt size opening therein, a flat horizontal end of said L-shaped member having a bolt size opening therein, a wing bolt assembly adapted to pass through said openings and secured by a nut and washer, whereby the L-shaped member may be rotated on the axis of said bolt to increase or decrease the size of the cradle formed between it and the U-shaped member.

10. A portable hauler adapted to carry a load on the side of an automobile as described in claim 9 wherein the means for connecting the cradle forming horizontal member to the main frame member comprises a bolt size opening in the main frame member, a washer, a bolt and a wing nut, a flat portion at the end of the cradle forming member, a bolt size opening of said flat portion whereby said bolt passes through the main frame member, through the washer, through the opening in the flat portion of the cradle forming member, and is threaded to said wing nut for locking said bolt and securing said cradle forming member to the main frame and whereby the cradle forming member may be rotated on the axis of said bolt, so as to extend the length of the main member, or to be perpendicular to said main frame member so as to form a cradle between the U-shaped member and the L-shaped member.

11. A portable hauler adapted to carry a load on the side of an automobile as described in claim 8 wherein the means for connecting the cradle forming horizontal member to the main frame member comprises a bolt size opening in the main frame member, a washer, a bolt and a wing nut, a flat portion at the end of the cradle forming member, a bolt size opening of said flat portion whereby said bolt passes through the main frame member, through the washer, through the opening in the flat portion of the cradle forming member, and is threaded to said wing nut for locking said bolt and securing said cradle forming member to the main frame and whereby the cradle forming member may be rotated on the axis of said bolt, so as to extend the length of the main member, or to be set perpendicular to said main frame member so as to form a cradle between the U-shaped member and the L-shaped member.

12. A portable hauler adapted to carry a load on the side of an automobile as described in claim 1 whereby the adjustable means connecting the first and second cradle forming horizontal members comprises a flat end of said cradle forming horizontal members with a bolt size opening therein, a flat horizontal end of said first and second L-shaped members having a bolt size opening therein, a wing bolt assembly adapted to pass through said openings and secured by a nut and washer, whereby the L-shaped members may be rotated on the axis of said bolt to increase or decrease the size of the cradle formed between it and the first and second U-shaped members.

13. A portable hauler adapted to carry a load on the side of an automobile as described in claim 12 wherein the means for connecting the cradle forming horizontal member to the main frame member comprises a bolt size opening in the main frame member, a washer, a bolt and a wing nut, a flat portion at the end of the cradle forming member, a bolt size opening of said flat portion whereby said bolt passes through the main frame member, through the washer, through the opening in the flat portion of the cradle forming member, and is threaded to said wing nut for locking said bolt and securing said cradle forming member to the main frame and whereby the cradle forming member may be rotated on the axis of said bolt, so as to extend the length of the main member, or to be perpendicular to said main frame member so as to form a cradle between the U-shaped member and the L-shaped member.

14. A portable hauler adapted to carry a load on the side of an automobile as described in claim 1 wherein the means for connecting the first and second cradle forming horizontal members to the main frame member comprises a bolt size opening in the main frame member, a washer, a bolt and a wing nut, a flat portion at one end of the cradle forming members, a bolt size opening of said flat portion whereby said bolt passes through the main frame member, through the washer, through the opening in the flat portion of the cradle forming members, and is threaded to said wing nut for locking said bolt and securing said cradle forming members to the main frame and whereby the cradle forming members may be rotated on the axis of said bolt, so as to extend the length of the main member, or to be set perpendicular to said main frame member so as to form a cradle between the first and second U-shaped members and the first and second L-shaped members respectively.

* * * * *